Oct. 26, 1926.
F. LIPKE
1,604,232
DRAFTSMAN'S TEMPLATE
Filed May 26, 1926
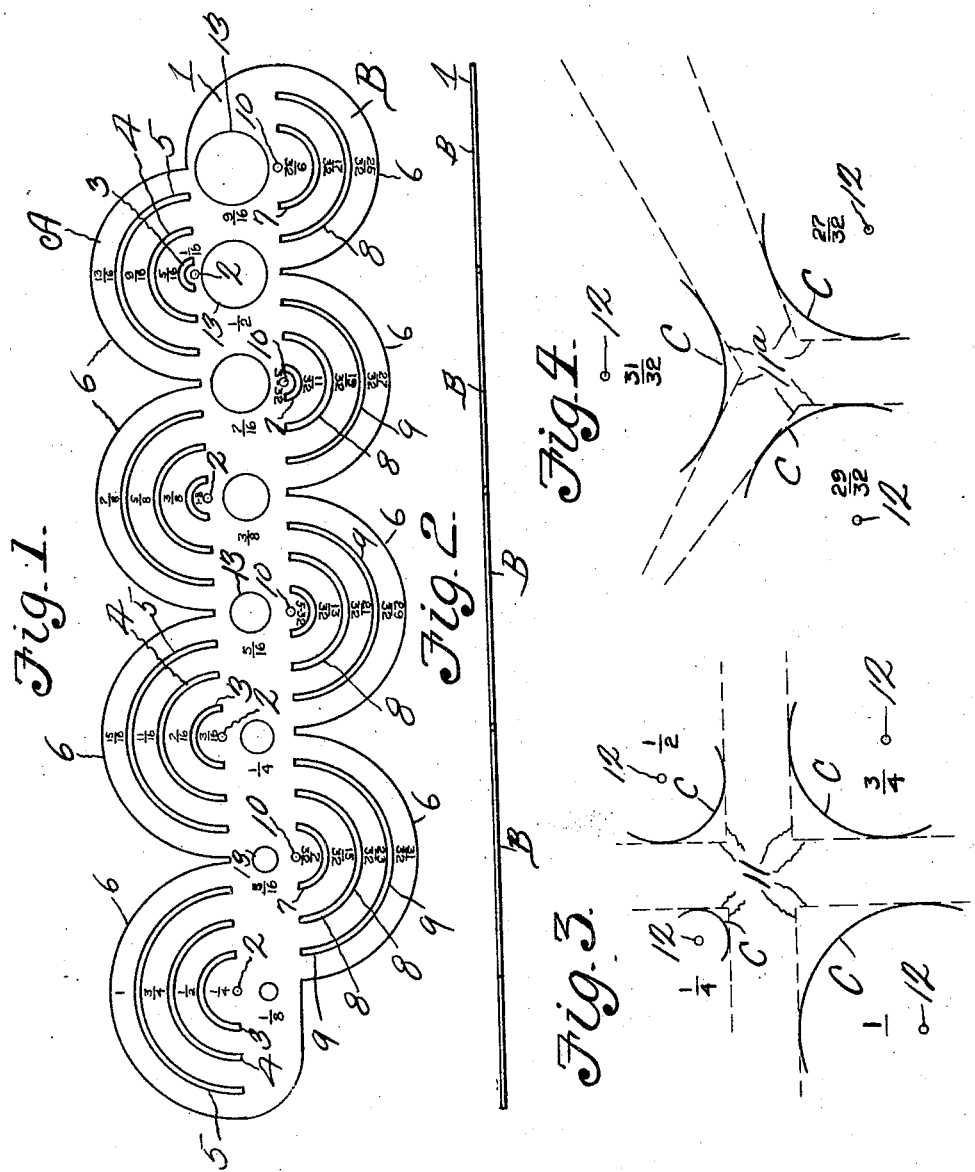
INVENTOR.
Frank Lipke
BY George J. Oltsch
ATTORNEY.

Patented Oct. 26, 1926.

1,604,232

UNITED STATES PATENT OFFICE.

FRANK LIPKE, OF MISHAWAKA, INDIANA.

DRAFTSMAN'S TEMPLATE.

Application filed May 26, 1926. Serial No. 111,804.

The invention relates to draftsmen's templates and has for its object to provide a device of this character preferably from a relatively thin transparent material, and provided with a plurality of slots having established radii whereby arcs may be made connecting converging lines and the centers established for said arcs thereby obviating loss of time in establishing centers in proper relation to the converging lines which is now the present practice.

A further object is to provide opposite sides of the device with outwardly extending members having concentrically arranged arcuate slots at various distances from the center and preferably stepped upwardly by sixteenths and thirty seconds at opposite sides of the device and preferably from one end of the device to the other, thereby allowing the arcuate slots to be disposed a substantial distance from each other for preventing weakening of the portion of the material between the slots, and at the same time allowing the use of slots varying in radius a fractional part of an inch, for instance a thirty second.

A further object is to form the outer edges of the projections arcuate in relation to the centers and concentric with the slots, thereby allowing said outer edges to be used in drawing an arcuate line. Also to dispose the projections in staggered relation for transversely bracing the template.

A further object is to provide the body of the template with a plurality of round apertures of different diameters which may be used for drawing relatively small circles.

With the above and other objects in view the invention resides in the combination and arrangement of parts as hereinafter set forth, shown in the drawing, described and claimed. it being understood that changes in the precise embodiment of the invention may be made within the scope of what is claimed without departing from the spirit of the invention.

In the drawing:—

Figure 1 is a plan view of the template.

Figure 2 is a side elevation of the template.

Figure 3 is a diagrammatic view showing in full lines arcs formed by the template connecting right angled lines and the establishment of the centers of the arcs.

Figure 4 is a view similar to Figure 1 showing arcs connecting obtusely disposed converging lines.

Referring to the drawing the numeral 1 designates the body of the template, which body at opposite sides thereof is provided with semicircular shaped projections A and B, which are preferably in staggered relation to each other whereby the body will not be transversely weakened, which would be the case if the projections were opposite each other. In drafting a great deal of time is consumed in making circles, for instance up to one inch for connecting converging lines and establishing the centers of said arcs, and to obviate this difficulty the device is primarily designed, and it is obvious a compact structure is necessary and the arcuate slots to be arranged in a manner whereby they are stepped upwardly or downwardly in radius on relatively small dimensions, otherwise the slots would be too close together to allow any material between the same, or where there is material left, the material would be too narrow and weak for practicability. The projections A at one side of the body member 1 are provided with center apertures 2 and the arcuate slots 3, 4, and 5 which are concentric with each other on the apertures 2. It will be noted that the arcuate slots 3 are stepped upwardly in radius one sixteenth of an inch from one end of the body member to the other, thereby preventing the bringing of the slots too close together which would be the case if they were stepped up on the same projection. The slots 4 and 5 are also stepped upwardly from one end of the device to the other for the same reason as above set forth. For the extreme dimensions of each projection A and B, the outer arcuate edges 6 are used, and which edges are concentric with the other slots. The projections B have their slots 7, 8 and 9 stepped upwardly by thirty seconds from one end of the device to the other and are concentric with the pencil receiving apertures 10 in the body member. When it is desired to use the device, and referring particularly to Figure 3 where right angularly disposed lines 11 are shown, the proper arcuate slot is placed in a position where the lines 11 are tangent thereto, and then the draftsman places a pencil through the particular slot and draws the arc, and immediately after drawing the arc, the draftsman can place his pencil through the particular aperture 2 or 10 and establish the centers 12, and when the time arrives for the inking or tracing of the drawing these centers can be easily located. Figure 4 is substantially the same as shown in Figure 3, with the exception that the arcs C connect obtusely disposed lines, however the same numerals apply thereto and the operation is the same.

From the above it will be seen that a draftsman's template is provided which has a novel arrangement of arcuate slots on established centers whereby a great deal of time can be saved by a draftsman in establishing centers and drawing circles connecting tangential lines, whether obtusely or otherwise disposed in relation to each other. It will also be seen that the arrangement of the slots on the projections prevents the slots from materially weakening the device, and by disposing the projections in staggered relation to each other, a relatively stiff template is provided, and one which is not transversely weakened as would be the case if the projections were opposite each other.

The body 1 of the device is preferably provided with a plurality of round apertures 13 of different diameters and which may be utilized by a draftsman for drawing small circles.

The invention having been set forth what is claimed as new and useful is:—

1. A draftsman's template comprising a body member having rows of projections along opposite sides thereof, the projections on one side being in staggered relation to those on the other side and each being provided with a plurality of arcuate slots concentric with respective center establishing apertures.

2. A draftsman's template comprising an elongated body member, projections along opposite sides of said body member and each having a plurality of arcuately arranged slots concentric with respective center establishing apertures, the radii of corresponding slots of the respective projections progressively increasing from one end to the other.

3. A draftsman's template comprising a body member, semicircular projections extending outwardly along opposite sides of the body member, the projections on one side being in staggered relation to those on the other, said semicircular projections having a plurality of arcuate slots concentric with respective center apertures, said projections having their outer edges concentric with the slots, said concentric slots having progressively increasing radii from one end to the other.

4. A draftsman's template comprising a body member having a plurality of spaced series of arcuate slots, those of each series being in concentric relation to each other and to a respective center and having progressively increasing radii from one end to the other.

In testimony whereof I affix my signature.

FRANK LIPKE.